United States Patent [19]

Kubo et al.

[11] 4,432,935

[45] Feb. 21, 1984

[54] METHOD OF PRODUCING POROUS BODY FOR SOLID ELECTROLYTIC CAPACITOR

[75] Inventors: Yoshimi Kubo; Shigeaki Shimizu; Tetsuo Suzuki; Hitoshi Igarashi, all of Tokyo, Japan

[73] Assignee: Nippon Electric Co., Ltd., Tokyo, Japan

[21] Appl. No.: 249,346

[22] Filed: Mar. 31, 1981

[30] Foreign Application Priority Data

Apr. 2, 1980 [JP] Japan ................... 55-43326

[51] Int. Cl.$^3$ ................. B22B 3/16
[52] U.S. Cl. .................. 419/2; 29/570; 419/30; 419/44; 419/46; 428/566
[58] Field of Search .......... 515/222, 221, 211, 175.5; 29/570; 428/566; 419/2, 30, 44, 46; 420/418, 528

[56] References Cited

U.S. PATENT DOCUMENTS

| | | | |
|---|---|---|---|
| 3,599,053 | 8/1971 | Iiada et al. ................ | 361/433 |
| 3,950,166 | 4/1976 | Obara et al. ............... | 75/221 X |
| 4,219,357 | 8/1980 | Yolton et al. .............. | 75/211 X |
| 4,331,477 | 5/1982 | Kubo et al. ................ | 75/228 |

FOREIGN PATENT DOCUMENTS

| | | | |
|---|---|---|---|
| 2940290 | 4/1980 | Fed. Rep. of Germany | ........ 75/222 |
| 51-10165 | of 1976 | Japan . | |
| 54-1020 | of 1979 | Japan . | |

*Primary Examiner*—Jack Cooper
*Attorney, Agent, or Firm*—Laff, Whitesel, Conte & Saret

[57] ABSTRACT

A porous body, for a solid electrolytic capacitor, is made from a combination of titanium and aluminum in order to reduce dependence upon tatalum, a material which is now in extremely short supply. First, the titanium hydride and aluminum are milled into an extremely fine micro-powder. Then, the powders are mixed with the aluminum content in the range of 45%–65%, compressed into the desired body shape, and given a three-step heat treatment. In the first step, the body is heated at a temperature of 400° to 500° C. for a dehydrogenation. In the second step, the dehydrogenated body is heated to an alloying temperature which is higher than 500° C., but lower than the melting point of aluminum. In the third step, the alloyed body is heated to a temperature which is higher than the melting point of aluminum (about 1000° C.).

2 Claims, No Drawings

METHOD OF PRODUCING POROUS BODY FOR SOLID ELECTROLYTIC CAPACITOR

BACKGROUND OF THE INVENTION

This invention relates to a method of producing a porous body for a solid electrolytic capacitor, and more particularly, to a method of producing titanium-aluminum a (Ti-Al) alloy porous body.

At present, tantalum (Ta) has been widely used as a valve metal for a solid electrolytic capacitor. Notwithstanding its excellent characteristics, however, the future of the Ta capacitor is not very bright because there is a shortage of Ta resources. Since a large amount of Ta has been consumed as a capacitor material in recent years, the Ta ore, which is originally rare, has become nore and more rare, and its price has soared as supplies dwindle. It is expected that sooner or later, the Ta capacitor must lose it marketability due to its soaring price. Accordingly, a development of a solid electrolytic capacitor, made of other materials, is urgently needed to replace the Ta capacitor.

As a valve metal for a solid electrolytic capacitor that will replace Ta, a Ti-Al alloy has been described. One of these description is includes in U.S. Pat. No. 3,599,053 entitled "IMPROVED TITANIUM ALLOY CAPACITOR". This patent relates to an electrode for an electrolytic capacitor using a Ti-Al or Ti-Al-Zr alloy porous body, and discloses capacitor characteristics of a dielectric layer formed by anodically oxidizing the surface of either the Al-Ti or Al-Ti-Zr alloy. In this prior art, the Ti-Al or the Ti-Al-Zr alloy porous body is formed by using Ti, Al and Zr powder as the starting materials. Then, these alloy powders are pressed into a predetermined shape. Thereafter, the pressed body is sintered at a temperature which is higher than the melting point of aluminum.

However, the present inventors believe that the sintered body produced from the starting Al-Ti alloy powder can not be used as an anode for an electrolytic capacitor that will replace Ta. When the Al-Ti alloy is a fine-grained powder, the amount of surface oxidation increases. That is, if a porous body comparable to Ta is to be formed, powder of a gran size in the order of about several microns must be dealt with. If a porous body is produced by using such micro-fine powder, however, large quantities of surface oxides remain. The result is a remarkable degradation of the capacitor characteristics.

Incidentally, the satisfactory capacitor characteristics can be maintained if the porous body is produced by using a micro-fine powder of Ta alone, primarily for the following reason. Besides the fact that Ta is originally a metal which has a low degree of natural oxidation, the sintering of the Ta powder is effected at a temperature which is higher than the decomposition point of the Ta oxides. In conjunction with this point, it is to be noted that Al or Ti or their alloys form oxides which are more stable than Ta, and these oxides can not be virtually decomposed by the heat-treatment in vacuum.

Meanwhile, the present inventors previously described in U.S. patent application Ser. No. 82,217 how to obtain a porous body of a Ti-Al alloy by first compression-molding the Ti powder and Al powder. Then the resulting molded article is heat treated at a temperature which is higher than 500° C., but below the melting point of Al. According to this prior application, it is possible to obtain a porous body having a specific surface area which is greater than the surface area of the aforementioned Ti-Al alloy porous body, and hence, to obtain a capacitor having greater capacitance. However, this prior patent application is not free from the drawback that since the micro-fine Ti and Al powder are employed as the starting materials, a natural oxidation of the Ti and Al powder is unavoidable during the production process.

As described above, these heretofore known methods of producing the Ti-Al alloy porous body fail to provide a product having a large specific surface area. Even if the product having a desired specific surface area can be obtained, the product unavoidably possesses inferior capacitor characteristics due to the surface oxidation of the Ti powdery particles. More particularly, its leakage current and dielectric loss characteristic become inferior. To prevent oxidation of the micro-fine powder during the production process, strict management of the starting powder is necessary but this in turn results in an increase in the production cost.

SUMMARY OF THE INVENTION

It is therefore an object of the present invention to provide a method of producing a porous body for a solid electrolytic capacitor, the porous body having capacitor characteristics which are comparable to those of a porous body produced from Ta.

Another object of the present invention is to provide a novel method of producing a solid electrolytic capacitor from a Ti-Al alloy.

Still another object of the present invention is to provide a method of producing a porous body for a solid electrolytic capacitor, the method being characterized by a method of producing a porous body of Ti-Al alloy particles. A mixture of Ti hydride powder and Al powder, as the starting materials, is compression-molded and the resulting molded article is subjected to heat-treatment.

In producing a Ti-Al alloy porous body, according to the present invention, a Ti hydride is employed as one of the starting powder. The Ti hydride is a stable compound and, even when milled into a micro-fine powder, the compound is not susceptible to the surface oxidation. For this reason, the Ti-Al alloy porous body, obtained by compression-molding the mixture of the Ti hydride and by Al powder and heat-treating the molded article, does not undergo a degradation of its leakage current value and electric loss. It can be shaped into an anode having a large electric capacitance per unit volume.

The present invention produces the Ti-Al alloy porous body by compression-molding a mixture of micro-fine $TiH_x (2 \geq X > 0.5)$ powder and Al powder. The resulting molded article is subjected to a de-hydrogenation treatment at a temperature of 400° C. to 500° C. for 30 to 60 minutes. Then, the article is given a heat-treatment at a temperature higher than 500° C., but below the melting point of aluminum, for a period of about one hour, thereby to cause the alloying reaction. Thereafter, the article is held at a temperature which is about 1,000° C., but higher than the melting point of aluminum over a predetermined period.

A preferred mixing ratio of the Ti hydride and the Al powder is selected so that the atomic percentage of Al is from 45 to 65% in the resultant Ti-Al alloy body or in the mixture, where the total amount of Ti and Al in the alloy body or in the mixture is 100%. Within this range, the product has excellent leakage current and dielectric loss characteristics.

DESCRIPTION OF THE PREFERRED EMBODIMENTS

A Ti hydride powder under 100 mesh size having a composition substantially approximate to $TiH_2$ and Al powder of an average grain size of 5 μm is produced by an atomizing method using a ball mill for grinding Ti. Milling and mixing of the Ti hydride powder and the Al powder were concurrently effected in an Ar atmosphere. The degree of milling of the Ti hydride was controlled by adjusting the milling time of the ball mill. Next, the mixture of the Ti hydride powder and the Al powder was compression-molded, and the resulting mold was placed into a vacuum furnace where it was subjected to a heat-treatment under the following conditions. Dehydrogenation was first effected at 400° C. to 500° C. in the course of about 30 minutes, and the temperature was held at a point lower, by 50° C., than the melting point of Al for about 10 minutes. Thereafter, the temperature was raised to about 1,000° C. and held at that temperature for one hour, followed by a cooling to room temperature. As a result of a degassing treatment at 400° to 500° C. for 30 minutes, hydrogen was reduced to a level below 100 ppm. As described above, the molded article was held at a temperature below the melding point of Al for about 10 minutes after the dehydrogenation treatment. If the temperature was drastically raised over the melting point of Al, there would be a fusing of the Al prior to an alloying of Al and Ti, thereby causing a swelling, reduction in the specific surface area and non-uniformity of the porous body.

An increase of the surface oxidation of the powder was not observed before or after the ball mill treatment.

The Ti-Al porous body, thus prepared, was anodically oxidized at 60 V in an aqueous solution of ammonium carbonate. The capacitor characteristics, such as its capacitance, leakage current (at 12 V) and dielectric loss was measured with respect to the anodic oxidized Ti-Al porous body. At the same time, a manganese dioxide cathode was attached, and a leakage current (at 12 V) and dielectric loss, under the solid state, were measured. The results of the measurement are shown altogether in the following table. Comparative Examples shown in the table represent porous bodies that were produced by a use of Ti powder having a 3 μm average grain diameter, instead of the Ti hydride. However, the production procedures including the mixing, heat-treatment and the like were the same as those of the Ti hydride.

In the Examples of the present invention using the Ti hydride, a milling of the Ti hydride proceeded along with the mixing treatment by the ball mill. The average grain diameter of the Ti hydride became 10 μm, 4 μm and 2 μm with the passage of a milling time of ½ hour, one hour and 4 hours, respectively. On the other hand, in Comparative Examples using Ti, a milling of Ti hardly occurred and the average grain diameter remained 3 μm.

| Group No. | Mixed Composition (atom % of Al to Ti) | Milling time of mixed power by ball mill | After formation | | | After attaching cathode | |
|---|---|---|---|---|---|---|---|
| | | | CV/vol. (μF·V/cm$^3$) | LC (nA/CVW) | tan $\delta_f$ (%) | LC (nA/CVW) | tan $\delta_f$ (%) |
| Examples | | | | | | | |
| 1 | 25–35 | ½ H | 2.8–2.6 × 10$^4$ | 10.7–3.4 | 2.4–1.9 | 1300–85 | 6.5–4.7 |
| 2 | 35–45 | " | 2.6–2.3 × 10$^4$ | 3.4–0.94 | 1.9–1.3 | 85–7.3 | 4.7–2.2 |
| 3 | 45–55 | " | 2.3–2.2 × 10$^4$ | 0.94–0.87 | 1.3–1.2 | 7.3–6.5 | 2.2–2.2 |
| 4 | 55–65 | " | 2.2–2.0 × 10$^4$ | 0.87–1.3 | 1.2–1.4 | 6.5–11 | 2.2–2.4 |
| 5 | 65–75 | " | 2.0–1.8 × 10$^4$ | 1.3–2.1 | 1.4–1.6 | 11–31 | 2.4–3.0 |
| 6 | 75–80 | " | 1.8–1.4 × 10$^4$ | 2.1–2.5 | 1.6–1.8 | 31–50 | 3.0–3.5 |
| 7 | 25–35 | 1 H | 7.4–7.2 × 10$^4$ | 12.5–3.9 | 2.4–1.8 | 2900–36 | 6.6–4.3 |
| 8 | 35–45 | " | 7.2–6.8 × 10$^4$ | 3.9–0.96 | 1.8–1.2 | 36–5.9 | 4.3–2.4 |
| 9 | 45–55 | " | 6.8–6.4 × 10$^4$ | 0.96–0.84 | 1.2–1.3 | 5.9–6.2 | 2.4–2.5 |
| 10 | 55–65 | " | 6.4–6.1 × 10$^4$ | 0.84–1.2 | 1.3–1.3 | 6.2–18 | 2.5–2.4 |
| 11 | 65–75 | " | 6.1–5.7 × 10$^4$ | 1.2–2.3 | 1.3–1.7 | 18–29 | 2.4–3.3 |
| 12 | 75–80 | " | 5.7–5.0 × 10$^4$ | 2.3–2.7 | 1.7–1.9 | 29–45 | 3.3–3.9 |
| 13 | 25–35 | 4 H | 18–16 × 10$^4$ | 10.4–4.0 | 2.6–2.0 | 2700–56 | 7.0–5.1 |
| 14 | 35–45 | " | 16–15 × 10$^4$ | 4.0–0.97 | 2.0–1.4 | 56–6.1 | 5.1–2.5 |
| 15 | 45–55 | " | 15–15 × 10$^4$ | 0.97–0.85 | 1.4–1.2 | 6.1–4.0 | 2.5–2.4 |
| 16 | 55–65 | " | 15–14 × 10$^4$ | 0.85–1.3 | 1.2–1.4 | 4.0–10.0 | 2.4–2.5 |
| 17 | 65–75 | " | 14–13 × 10$^4$ | 1.3–2.4 | 1.4–1.7 | 10.0–42 | 2.5–3.2 |
| 18 | 75–80 | " | 13–9 × 10$^4$ | 2.4–3.0 | 1.7–1.9 | 42–60 | 3.2–3.7 |
| Comparative Examples | | | | | | | |
| a | 25–35 | ½ H | 9.0–8.5 × 10$^4$ | 140–57 | 2.9–2.4 | 3500–3100 | 10.3–8.0 |
| b | 35–45 | " | 8.5–8.0 × 10$^4$ | 57–11 | 2.4–1.9 | 3100–120 | 8.0–4.2 |
| c | 45–55 | " | 8.0–7.6 × 10$^4$ | 11–15 | 1.9–1.9 | 120–110 | 4.2–4.3 |
| d | 55–65 | " | 7.6–7.2 × 10$^4$ | 15–29 | 1.9–1.8 | 110–190 | 4.3–4.3 |
| e | 65–75 | " | 7.2–6.5 × 10$^4$ | 29–33 | 1.8–2.3 | 190–480 | 4.3–6.0 |
| f | 75–80 | " | 6.5–6.0 × 10$^4$ | 33–39 | 2.3–2.5 | 480–630 | 6.0–7.0 |
| g | 25–35 | 4 H | 9.5–9.0 × 10$^4$ | 180–60 | 2.9–2.7 | 3400–3200 | 11.5–9.2 |
| h | 35–45 | " | 9.0–8.5 × 10$^4$ | 60–21 | 2.7–2.0 | 3200–210 | 9.2–6.0 |
| i | 45–55 | " | 8.5–8.2 × 10$^4$ | 21–18 | 2.0–2.0 | 210–150 | 6.0–4.2 |
| j | 55–65 | " | 8.2–7.5 × 10$^4$ | 18–27 | 2.0–2.0 | 150–300 | 4.2–5.3 |
| k | 65–75 | " | 7.5–6.7 × 10$^4$ | 27–30 | 2.0–2.4 | 300–420 | 5.3–5.9 |
| l | 75–85 | " | 6.7–6.1 × 10$^4$ | 30–35 | 2.4–2.7 | 420–700 | 5.9–6.5 |

As is obvious from the above table, when the Ti hydride was employed in accordance with the present invention, there was an extremely great capacitance per unit volume. Especially when the milling time by the ball mill was extremely prolonged, a value ranging from 100,000 μFV/cm$^3$ to 150,000 μFV/cm$^3$ could be reproduced with a high level of accuracy with both excellent LC and tan. That value is at least twice the value realized by the presently available Ta capacitor. In Comparative Examples, on the other hand, a degradation on cathode attachment was remarkable and both LC and tan δ were degraded drastically, though anodic oxide formation was possible with difficulty. These remarkable differences between Examples of the invention and Comparative Examples resulted from the fact that the Ti-Al porous body of the invention, starting from the Ti hydride, was likely to diminish in volume, whereas the Ti-Al porous body of Comparative Examples, starting from Ti, was likely to swell.

Consequentially, the porous body in Examples of the present invention had a superior and excellent mechanical strength.

As described above, the porous body in accordance with the present invention formed by mixing the powdery Ti hydride and powdery Al and compression-molding and heat-treating the mixed powder can exhibit excellent characteristics, as solid electrolytic capacitors. Those characteristics have not so far been accomplished.

In summary, the present invention provides a porous body for an anode having excellent capacitance and other electric characteristics. Those characteristics could not be accomplished by use of the micro-fine Ti powder. However, those characteristics can easily be obtained by mixing the micro-fine Ti hydride powder and the micro-fine Al powder, compression-molding the mixture and applying a heat-treatment, represented by a vacuum heat-treatment including the dehydrogenation treatment.

For ease of explanation, the foregoing Examples of the present invention employ the Ti hydride having the composition which is virtually approximate to the composition of TiH$_2$. It has been confirmed, however, that if a Ti hydride, e.g., TiH$_x$ (where x>0.5), that becomes brittled after absorbing hydrogen to such an extent as to be capable of being milled, is employed, substantially similar effects can also be obtained. The Ti hydride powder and the Al powder may be milled by using the ball mill as in the Examples of the present invention in order to simultaneously mill the Ti hydride and mix the Al powder. Alternatively, it is also possible to mill in advance the Ti hydride powder and then to mix it with the Al powder. In short, it is important that the Ti hydride having a predetermined grain size be mixed with the Al powder.

As to the mixing composition of the Ti hydride and the Al powder, there is an excellent result from a porous body in which the mixing ratio is 45 to 65% in terms of the atomic percentage of Al to Ti, that is, a porous body having substantially equal atomic % for Ti and Al. This body exhibits excellent leakage current- and dielectric loss-characteristics.

As described in the foregoing, the present invention has a great significance in that it provides a method of producing a porous body for an economical solid electrolytic capacitor. The porous body can replace Ta and far exceeds Ta in respect of capacitance per unit volume.

What is claimed is:

1. A method of producing a porous body for a solid electrolytic capacitor comprising the steps of: mixing powdered titanium hydride expressed by the general formula TiH$_x$ (where $2 \geq X > 0.5$) and powdered aluminum, compression-molding the mixture to form an article, dehydrogenating the compression-molded article at a temperature of 400° to 500° C. for thirty to sixty minutes, subjecting the dehydrogenated, molded article to an alloying reaction at a temperature which is higher than 500° C. and below the melting point of aluminum for about one hour, and holding the alloyed article at a temperature of about 1000° for a predetermined period.

2. The method of claim 1, wherein said powdered titanium hydride and powdered aluminum have an average grain size of 5 microns.

* * * * *